United States Patent
Elsayed et al.

(10) Patent No.: US 10,836,641 B1
(45) Date of Patent: *Nov. 17, 2020

(54) PROCESS FOR FORMING GRAPHENE-COATED PARTICLES

(71) Applicant: King Abdulaziz University, Jeddah (SA)

(72) Inventors: Waleed Elsayed Mahmoud Elsayed, Jeddah (SA); Ahmed Abdullah Salem Al-Ghamdi, Jeddah (SA); Yusuf Abdulaziz Al-Turki, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/985,869

(22) Filed: Aug. 5, 2020

Related U.S. Application Data

(63) Continuation of application No. 16/510,080, filed on Jul. 12, 2019.

(51) Int. Cl.
   *C01B 32/184* (2017.01)
(52) U.S. Cl.
   CPC ........ *C01B 32/184* (2017.08); *C01B 2204/02* (2013.01)
(58) Field of Classification Search
   CPC . C01B 32/182; C01B 32/198; C01B 2204/02; C01B 2204/04; C01B 2204/06;
   (Continued)

(56) References Cited

U.S. PATENT DOCUMENTS 9,586,825 B2    3/2017   Bozalina et al.

FOREIGN PATENT DOCUMENTS

CN    103058176 A    4/2013
CN    104229779 A    12/2014
(Continued)

OTHER PUBLICATIONS

Wang, et al. ; Graphene prepared via a novel pyridine-thermal strategy for capacitive deionization ; Journal of Materials Chemistry ; The Royal Society of Chemistry ; 2012 ; 7 Pages.
(Continued)

*Primary Examiner* — Daniel C. McCracken
(74) *Attorney, Agent, or Firm* — Oblon, McClelland, Maier & Neustadt, L.L.P.

(57) ABSTRACT

Methods of forming graphene may include reacting a dispersed mixture, comprising fly ash, a charged heteroaromatic compound, particularly a pyridinium compound, such as a 1-(4-pyridyl)-pyridinium salt, and a solvent, particularly an alcohol, such as ethanol, with a polymeric oxidizing agent, preferably polymer-supported pyridinium chlorochromate, to form a second mixture; and contacting the second mixture at a temperature of 120 to 180° C. with a gas stream comprising at least 0.1 vol. % $CH_4$ and at least 10 vol. % $H_2$ to form graphene on the fly ash. Methods of managing waste may comprise using fly ash waste to produce graphene. Devices for implementing such methods may involve steel cylindrical reaction vessels including a cover through which a valve-stoppable pipe is fed, which reaction vessel is at least partially surrounded by a heating device, and suitable for handling solvent and fly ash, as well as for receiving gas inflow through the pipe.

6 Claims, 8 Drawing Sheets

(58) Field of Classification Search
CPC .......... C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23
See application file for complete search history.

(56) References Cited

FOREIGN PATENT DOCUMENTS

| | | |
|---|---|---|
| CN | 108821269 A | 11/2018 |
| CN | 108912493 A | 11/2018 |

OTHER PUBLICATIONS

Akhavan, et al. ; Synthesis of graphene from natural and industrial carbonaceous wastes ; RSC Advances, Issue 39 ; 2014 ; Abstract Only ; 2 Pages.

PROCESS FOR FORMING GRAPHENE-COATED PARTICLES

CROSS-REFERENCE TO RELATED APPLICATIONS

The present application is a Continuation of Ser. No. 16/510,080, pending, having a filing date of Jul. 12, 2019.

BACKGROUND OF THE INVENTION

Field of the Invention

The present disclosure relates to the preparation of graphene, preferably by using fly ash, as well as such graphene materials themselves and their uses, in addition to methods of managing waste.

Description of the Related Art

Fly ash or flue ash is a coal combustion product, e.g., from the combustion of coal in coal-fired power plants. Flue ash is made up of particulates from the combustion, including fine particles of burned fuel and minerals, that are driven out of coal-fired boilers together with the flue gases. Fly ash can be captured by electrostatic precipitators or other particle filtration equipment, e.g., before the flue gases reach the chimneys, and/or can be collected at the bottom of boilers as bottom ash. Combined bottom ash and flue ash is also called coal ash.

The components of fly ash can vary considerably based on the composition of the coal combusted. All fly ash includes silicon dioxide ($SiO_2$), aluminum oxide ($Al_2O_3$), iron oxide ($Fe_2O_3$), and calcium oxide (CaO) which are the main mineral compounds in coal-bearing rock strata. Flue ash can also contain, e.g., in trace concentrations up to hundreds ppm, As, Be, B, Cd, Cr, Co, Pb, Mn, Hg, Mo, Se, Sr, Tl, and/or V, generally as oxides, as well as unburnt carbon or partially combusted hydrocarbons. Fly (and bottom) ash can be produced from solid waste incineration, whereby the ash may contain higher levels of contaminants than coal ash. Such ash is often classified as hazardous waste.

Fly ash generally comprises the same ashes generated in the combustion of other fuel resources, such as crude oil and/or fractions thereof, including but not restricted to bottom and bark ashes. Fly ash may include an assortment of ashes. Incombustible, inorganic substances in the fly ash can be fused by the combustion heat to form glassy, partially crystalline, or amorphous structures. Given that certain contaminants in fly ash have a negative environmental impact, e.g., in landfills where these contaminants could seep into water tables, it would be beneficial to convert these ashes to useful substances.

Fly ash particles generally have a spherical shape with mean size in the range of 0.5 to 100 μm. Fly ash may be used as a pozzolan in hydraulic cement, hydraulic plaster, and to replace or supplement for Portland cement in concrete production, e.g., to help setting in concrete and plaster and/or protect concrete from water and other chemical attack.

The oxides in fly ash could be a fruitful topic for exploration as suitable catalytic sources for the growth of graphene. Graphene is an important compound which has shown great application potential in the field of optoelectronic devices such as flat panels, conducting transparent electrodes, and supercapacitors. The facile and low cost production of graphene by is a challenging matter facing the market. Moreover, a use for waste or otherwise unusable compounds would be beneficial. Certain efforts are known in the art.

U.S. Pat. No. 9,586,825 to Bozalina et al. (Bozalina) discloses large scale production of functionalized graphene including combining crystalline graphite with a first electrolyte solution including a metal hydroxide salt, an oxidizer, and/or a surfactant; milling the crystalline graphite in the presence of a first electrolyte solution for a first time period to produce a thinned intermediate material; combining the thinned intermediate material with a second electrolyte solution including a strong oxidizer and a metal hydroxide salt, a weak oxidizer, and/or a surfactant; then milling the thinned intermediate material in the presence of the second electrolyte solution for a second time period to produce functionalized graphene. Bozalina may use a weak oxidizer, such as dilute $H_2O_2$, chromate, chlorate, perchlorate, but does not specifically indicate using PCC (pyridinium chlorochromate), nor using fly ash as a starting carbon material, nor employing any particular gas in the synthesis.

CN 108821269 A by Hu et al. (Hu) discloses porous graphene and its preparation, involving mixing graphite powder and concentrated $H_2SO_4$ in an ice bath, adding an oxidizing agent, performing a medium-temperature reaction, performing a high-temperature reaction, adding a pore agent, adding a coagulation agent, performing pumping filtration with HCl and washing, drying the material, and performing high-temperature reduction. Hu's graphene has pores of from 1 nm to 20 μm and Hu uses a pore-forming agent which may include $KMnO_4$, $K_2S_2O_8$, and/or $K_2Cr_2O_7$, as well as a coagulation agent which may be is polyacrylic acid, polymethacrylic acid, polystyrenesulfonic acid, polyvinylsulfonic acid, polyvinylamine, polyvinylpyridine, polyvinyl alcohol, polydiallyldimethyl chloride One or more of ammonium, methacryloyloxyethyltrimethylammonium chloride and N,N-dimethylaminoethyl (meth)acrylate, but Hu does not describe using fly ash or a gas, e.g., $CH_4$, in Hu's synthesis of graphene.

CN 103058176 A by Chen et al. (Chen) discloses preparing graphene by weighing soluble inorganic salt and/or soluble organic matter to expanded graphite (raw material) in a mass ratio of from 10:1 to 200:1, and adding these into distilled water, heating, mixing uniformly until the inorganic salt and/or organic matter are dissolved completely, placing into a drying box until the water is volatilized completely to obtain the mixture of the expanded graphite, inorganic salt and/or organic matter, placing the mixture into a ball-milling tank and ball milling, separating the milled products, washing with water, filtering, and drying to obtain the graphene. Chen's inorganic salt may be any soluble chloride, nitrate, sulfate, carbonate, chromate, sulfonate, and/or phosphate, and Chen's organic matter is an organic compound which is solid and soluble in water at normal temperature selected from urea, sucrose, acetate, pyridinium acetate, tartrate, and/or benzoate. While Chen's method may use pyridinium acetate as a reagent, Chen does not use fly ash nor any gas in its synthesis, and teaches avoiding the typical epitaxial growth methods involving gases.

CN 104229779 A by X. Wang (X. Wang) discloses recyclable graphene comprising, by weight: 13 to 27 parts of fluorinated graphite, 75 to 80 parts of graphite, 1 to 5 parts of coal ash, 11 to 23 parts of a brominated water dispersed body, 13 to 28 parts of methyl allyl cyclohexene, 10 to 14 parts of quartz sand, 15 to 36 parts of methanol, 5 to 8 parts of butyryltrihexylcitrate, 15 to 27 parts of nonyl hexyl trimellitate, 50 to 77 parts of diethylene glycol benzoate, and 78-80 parts of water. X. Wang discloses a very specific process with numerous components. While X. Wang discloses coal ash, it does not specify whether this includes fly ash, nor does it disclose forming a polymerized pyridine on fly ash, nor exposing the fly ash to gases not naturally present in air, such as $CH_4$ or $H_2$ concentrations.

CN 108912493 A by Cheng et al. (Cheng) discloses a graphene wheel hub and its production from pulverized fuel ash and carbon dioxide. Cheng prepares carbon black and graphene from $CO_2$ and Al, Ti, or Mg alloy extracted from the pulverized fuel ash are subjected to hot melting to be cast into graphene Al, Ti, or Mg alloy wheel hubs. Cheng first extracts $Al_2O_3$, $TiO_2$, and MgO from fly ash to prepare their elemental or alloy forms, then captures $CO_2$ from metallurgy, chemical industry, or power plants to mix it with Mg and form graphene at 500 to 3000° C. by a plasma method, then melts the graphene with a metal to form the graphene-metal alloy. Cheng also describes desulfurizing fly ash, but does not use appear to use the carbon in the fly ash, instead recovering metals from the fly ash to catalyze $CO_2$ sequester. Cheng also fails to mention forming a polymerized pyridine on fly ash or exposing the fly ash to $CH_4$ and/or $H_2$.

*J. Mater. Chem.* 2012, 22(45), 23745-23748 by H. Wang et al. (H. Wang) discloses a pyridine-thermal strategy for successive exfoliation and reduction of graphite oxide using pyridine as an intercalating agent and dispersant, reporting the graphene produced to exhibit good performance in capacitive deionization. H. Wang describes dispersing graphite oxide pyridine and ethanol, heating, and reducing with hydrazine to produce graphene, but does not mention fly ash, nor treating the material with methane.

*RSC Adv.* 2014, 4(39), 20441-20448 by Akhavan et al. (Akhavan) discloses a synthesis of graphene oxide (GO) and reduced graphene oxide (rGO) sheets from natural and industrial carbonaceous wastes such as vegetation wastes (wood, leaf, bagasse, and fruit wastes), animal wastes (bone and cow dung), a semi-industrial waste (newspaper), and an industrial waste (soot powders produced in exhaust of diesel vehicles). Akhavan's graphene sheets may have up to 4-monolayer thicknesses and electrical resistance of ~$10^5$ MΩ/sq for GO and ~1 MΩ/sq for rGO sheets, nearly independently of the starting material. While Akhavan discloses diesel soot, it does not appear to mention fly ash.

In light of the above, a need remains for new methods of producing graphene oxide and/or processing industrial wastes, such as fly ash, into useful materials, particularly graphene oxide.

SUMMARY OF THE INVENTION

Aspects of the invention provide methods for forming graphene comprising: reacting a dispersed mixture, comprising fly ash, a charged heteroaromatic compound, and a solvent, with a polymer-supported oxidizing agent to form a second mixture; and contacting the second mixture at a temperature of 120 to 180° C. with a gas stream comprising at least 0.1 vol. % $CH_4$ and/or at least 10 vol. % $H_2$ to form graphene on the fly ash. Such methods may be modified by any permutation of the features described herein, particularly the following.

The reacting may occur at a temperature in a range of from 10 to 50° C. The reacting may occur for a duration in a range of from 15 to 180 minutes. The fly ash and the charged aromatic compound may be used in the reacting in a relative weight ratio in a range of from 1:1.5 to 1:3. The solvent may comprise at least 90 wt. % of an alcohol, based on total solvent weight.

The charged heteroaromatic compound may comprise pyrylium and/or charged N-heteroaromatic salt. The charged heteroaromatic compound may comprise a pyridinium, imidazolium, imidazolinium, quinolinium, isoquinolinium, pyrazolium, oxazolium, phenanthrolinium, thiazolium, benzothiazolium, imidazolium, triazolium, 1,2,5-oxadiazolium, 1,2,3-oxadiazolium, thiadiazolium, pyridazinium, pyrazinium, triazinium, oxazinium, tetrazolium, pyrimidinium, indolizinium, indazolium, azaindolium, napththyridinium, pyrido[3,2-d]pyrimidinium, pyrido[4,3-d]pyrimidinium, pyrido[3,4-b]pyrazinium, pyrido[2,3-b]pyrazinium, pteridinium, or purinium unit.

The charged heteroaromatic compound may have a structure of Formula I:

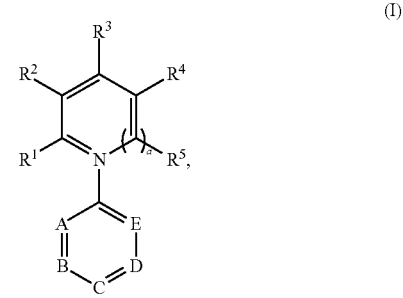

(I)

wherein a is 0 or 1, $R^1$ to $R^5$ are independently H, phenyl, benzyl, alkyl, monofluoroalkyl, perfluoroalkyl, alkoxy, fluoro, chloro, amide, carboxylate, sulfonate, ester, or amine, whereby 1 or 2 adjacent pairs of $R^1$ to $R^5$ may form a fused 5, 6, or 10-member ring, and A to E are independently $CR^6$ or N, $R^6$ independently being any of the groups indicated for $R^1$ to $R^5$.

In the charged heteroaromatic compound, "a" may be 1, at least 3 of $R^1$ to $R^5$ may be H, and/or at least one of A to E may be N. The charged heteroaromatic compound may comprise at least 75 wt. % of a 1-(4-pyridyl)-pyridinium salt. The charged heteroaromatic compound may be 1-(4-pyridyl)-pyridinium chloride hydrochloride. The polymer-supported oxidizing agent may be poly(4-vinylpyridinium chlorochromate).

The gas stream in the contacting may comprise at least 1 vol. % $CH_4$ and/or at least 50 vol. % $H_2$. The gas stream may comprise 2 to 10 vol. % $CH_4$ and/or 90 to 98 vol. % $H_2$. The second mixture may comprise a polymerized pyridine in contact with the fly ash. The contacting may be for a time period in a range of from 2 to 20 seconds.

The graphene may be monolayer graphene and/or may have a Raman 2D and G peak intensity ratio, I2D/IG, of at least 2. A Raman 2D and G peak intensity ratio, I2D/IG, of the graphene may be 1±0.1.

Aspects of the invention include devices configured to produce graphene according to any inventive method described herein. Inventive devices may comprise: a steel reaction vessel; a cover, removably-attached to the reaction vessel, configured to seal a reactor space of the reaction vessel and allow access to the reaction vessel upon removal, the cover including at least one hole suitable for a feed into the reaction vessel without the removal of the cover; a heating apparatus at least partially encompassing and in direct contact with the reaction vessel; a pipe, configured to extend from outside an outer perimeter of the heating apparatus through the hole in the cover, into the reaction vessel, the pipe including a valve configured to regulate gas flow into and/or out of the reaction vessel; and a sheath configured to directly contact and surround an outer surface of the pipe across an interface between the cover and the reaction vessel, the sheath comprising a heat resistant elastomer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
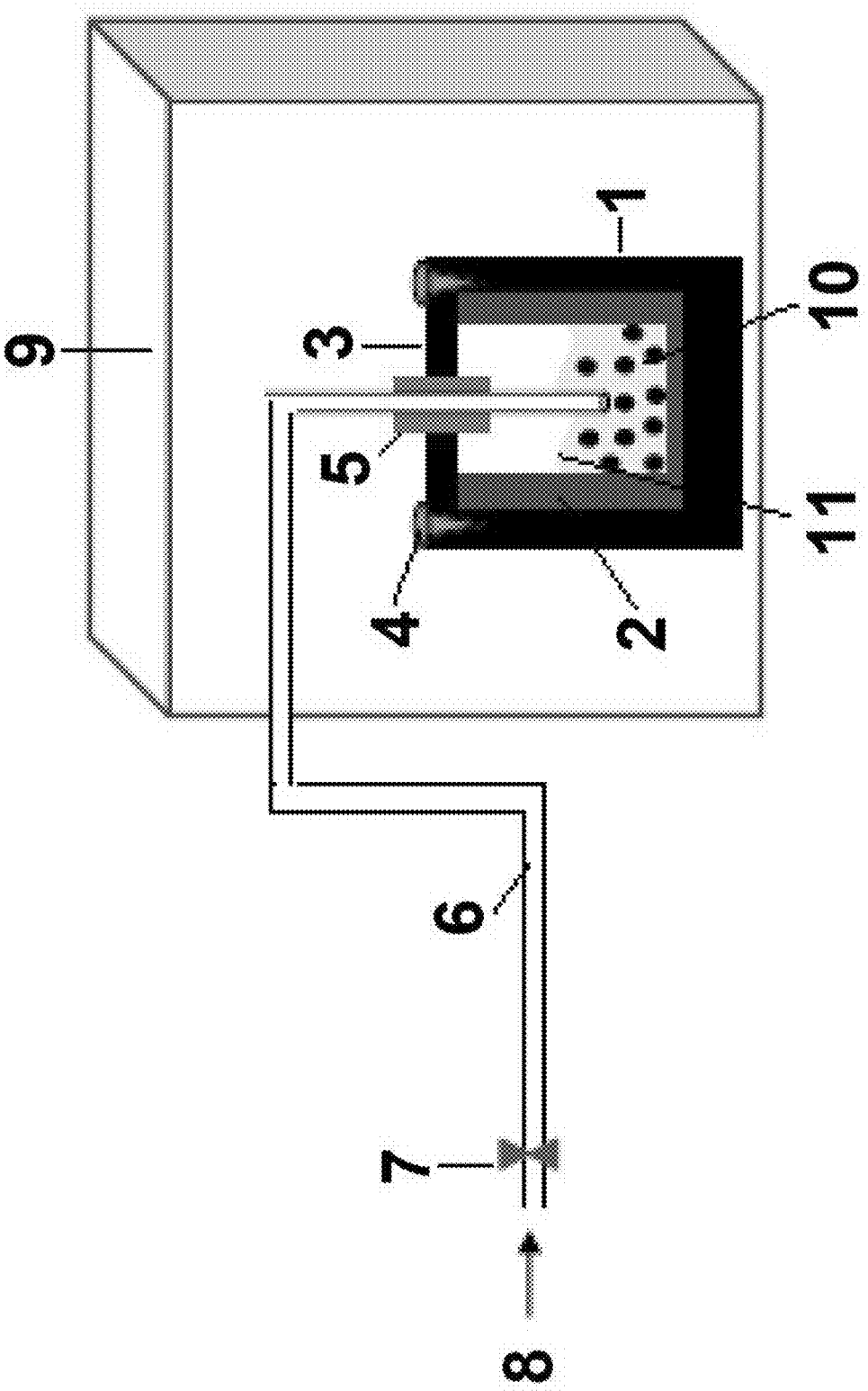
FIG. 1 shows a schematic diagram of a suitable system for preparing graphene within the scope of the invention.

Aspects of the invention provide methods for forming graphene comprising: reacting a dispersed mixture, comprising fly ash, a charged heteroaromatic compound, and a solvent, with a polymer-supported oxidizing agent to form a second mixture; and contacting the second mixture at a temperature of 120 to 180° C., e.g., either of these endpoints and/or at least 125, 130, 135, 140, 145, or 150° C. and/or up to 175, 170, 160, 155, 150, or 145° C. with a gas stream comprising at least 0.1, 0.25, 0.5, 0.75, 1.0, 1.25, 1.5, 1.75, 2.0, 2.5, 3, 4, or 5 vol. % $CH_4$ (up to 20, 17.5, 15, 14, 13, 12, 11, 10, 9, 8, or 7.5 vol. % $CH_4$) and/or at least 10, 25, 33, 45, 55, 65, 75, 80, 85, 87.5, or 90 vol. % $H_2$ (up to 99, 97.5, 95, 92.5, 90, 85, 80, 75, 70, 65, or 60 vol. % $H_2$) to form graphene on the fly ash. The solvent-to-total-reagent weight ratio may be in a range of, for example, at least 100:1 250:1, 333:1, 500:1, 650:1, 750:1, 1000:1, 1250:1, or 1500:1 and/or up to 5000:1, 4500:1, 4000:1, 3500:1, 3000:1, 2500:1, 2000:1, 1750:1, 1500:1, 1250:1, 1000:1, or 750:1. The mass-fly-ash-to-moles-charged-compound ratio may be at least 1:1, 1:2, 1:3.3, 1:5, 1:6.7, 1:7.5, 1:10, 1:11, 1:12, 1:12.5, 1:13.3, 1:15, 1:17.5, or 1:20 (g/mmol) and/or 1:50, 1:40, 1:33, 1:30, 1:25, 1:20, 1:17.5, 1:15, or 1:12.5 (g/mmol), disregarding any counterions and acids and based upon a single charge per molecule. While the charged heteroaromatic compound may preferably contain a charged N-heteroaromatic compound, particularly a pyridinium, this structure is not thought to be limiting, and a variety of permanently charged aromatics, such as pyrylium, may be used. Moreover, the charged heteroaromatic compound preferably includes at least one further basic N, which may be from a further pyridine, imidazole, pyrazine, pyrazole, or the like, which may be fused with or otherwise bonded to the charged ring. While aromatic rings have been successfully tested, it is believed that aliphatic rings and/or chains may also be useful.

Such further fused and/or bonded heterocylcic units may include, for example, pyrrolidine, pyrazolidine, imidazolidine, pyrazole, imidazole, 1,2,4-triazole, 1,2,3-triazole, tetrazole, oxazole, isoxazole, isothiazole, thiazole, 1,2-oxathiolane, 1,2,5-oxadiazole, 1,3,4-thiadiazole, 1,2,5-thiadiazole, piperidine, pyridine, piperazine, pyridazine, pyrimidine, pyrazine, 1,2,4-triazine, 1,3,5-triazine, morpholine, thiomorpholine, hexahydro-1H-pyrrolizine, indoline, benzimidazole, 7-azaindole, 4-azaindole, 5-azaindole, 6-azaindole, 7-azaindazole, pyrazolo[1,5-a]pyrimidine, purine, benzo[d]isoxazole, benzo[c]isoxazole, benzo[d]isothiazole, benzo[c]isothiazole, benzo[d]oxazole, benzo[d]thiazole, benzo[c][1,2,5]thiadiazole, ladenine, guanine, decahydroisoquinoline, decahydroquinoline, 1,2,3,4-tetrahydroquinoline, quinoline, isoquinoline, quinoxaline, phthalazine, quinazoline, cinnoline, 1,8-napththyridine, pyrido[3,2-d]pyrimidine, pyrido[4,3-d]pyrimidine, pyrido[3,4-b]pyrazine, pyrido[2,3-b]pyrazine, pteridine, acridine, phenazine, quinuclidine, 1-azaadamantange, DABCO, and/or 2-azadamantane. These or the charged ring, may be substituted with 1, 2, 3, 4, 5 or more substituents, and the substituents are generally only limited by reactivity and solubility, but may include (where not —H) fluoride, (C1, C2, C2, C4, or C5) alkyl, alkoxy, amide, amine, ether, or ester groups, nitrile, alcohol (C0, C1, C2, C2, or C4), or the like.

The dispersed mixture, comprising fly ash, a charged heteroaromatic compound, and a solvent, may be agitated, vibrated, and/or sonicated before reacting with the (optionally polymer-supported) oxidizing agent. The agitation, vibration, and/or sonication may be carried out for at least 5, 10, 15, 20, 25, 30, or 45 minutes, and/or up to 180, 150, 120, 90, 60, or 45 minutes. The reacting of the may occur at a temperature in a range of from 10 to 50° C., e.g., either of these endpoints and/or at least 15, 17.5, 20, 22.5, 25, 27.5, or 30° C. and/or up to 90, 75, 60, 45, 40, 35, 30, or 25° C. The reacting may occur for a duration of at least 10, 15, 20, 25, 30, 35, 40, 45, 50, or 60 minutes and/or up to 180, 170, 160, 150, 140, 130, 120, 110, 100, 90, 80, 70 or 60 minutes. The fly ash and the charged aromatic compound may be used in the reacting in a relative weight ratio of, e.g., 1:1.5, 1:1.6, 1:1.7, 1:1.75, 1:1.8, 1:1.9, 1:2, or 1:2.1 and/or up to 1:3, 1:2.9, 1:2.8, 1:2.7, 1:2.6, 1:2.5, 1:2.4, 1:2.33, 1:2.25, 1:2.2, 1:2.1, or 1:2. The solvent may comprises at least 90, 91, 92, 92.5, 93, 94, 95, 96, 97, 97.5, 98, 99, 99.1, 99.5, or 99.9 wt. %, based on total solvent weight, of one or more protic solvent, e.g., alcohol(s) such as methanol, ethanol, propanol, isopropanol, butanol, and/or ethylene glycol. Alternate solvents may replace or supplement the alcohol(s), as discussed below, though ethanol is exemplified herein.

The charged heteroaromatic compound may comprise a pyrylium salt and/or a charged N-heteroaromatic salt, which may be an internal salt. The charged heteroaromatic compound may certain N-heteroaromatic units, discussed below, which may be of Formula I, below, for example, wherein the upper ring "N" is charged (not shown) and the lower ring may be replaced an aromatic compound, preferably containing a basic N, or replaced by an aliphatic ring or chain with a preferably tertiary amine. For example, the lower ring may be supplanted for a DABCO, 1-azaadamantane, or e.g., 1-methylpiperazine unit.

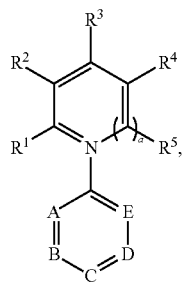

(I)

wherein a is 0 or 1 (or theoretically 2 in an azulene-like structure), $R^1$ to $R^5$ are independently H, phenyl, benzyl, alkyl, monofluoroalkyl, perfluoroalkyl, alkoxy, fluoro, chloro, amide, carboxylate, sulfonate, ester, or amine, whereby 1 or 2 adjacent pairs of $R^1$ to $R^5$ may form a fused 5, 6, or 10-member ring, and A to E are independently $CR^6$ or N, $R^6$ independently being any of the groups indicated for $R^1$ to $R^5$. One of A to E may also be absent, i.e., leaving a 5-member ring. While shown in Formula I as both aromatics, either ring or the lower may be an aliphatic ring or chain. Moreover, the rings may be fused along two (or more) bonds, whether the both rings are or one ring is aliphatic.

In the charged heteroaromatic compound of Formula I, "a" may preferably be 1, 1, 2, 3, 4, or 5 of $R^1$ to $R^5$ may be H, and/or 1, 2, 3, or 4 of A to E may be N. The charged heteroaromatic compound may comprise at least 75, 80, 85, 90, 91, 92, 92.5, 93, 94, 95, 96, 97, 97.5, 98, 99, 99.1, 99.5, or 99.9 wt. % or more of a 1-(4-pyridyl)-pyridinium salt. The charged heteroaromatic compound may be 1-(4-pyridyl)-pyridinium chloride hydrochloride, though the counterion may be any halide ($F^-$, $Cl^-$, $Br^-$, $I^-$), acetate, formate, citrate, tartrate, sulfate, benzoate, propionate, pyvalate, mesylate, besylate, borate, tosylate, ethylsulfonate, or fluorinated analogs of any of these, as well as any other suitable counterions described herein. The acid need not be HCl, and may be entirely or partially replaced by, for example, the acids of any of the above, e.g., HBr, HI, HOAc, etc., counterions. The polymer-supported oxidizing agent may be poly(4-vinylpyridinium chlorochromate), though certain applications may allow non-polymer supported oxidizing agents.

The gas stream in the contacting may comprise at least 1, 1.5, 2, 2.5, 3, 3.5, 4, 4.5, 5, 5.5, 6, 6.5, 7, 7.5, 8, 8.5, 9, 9.5, or 10 vol. % $CH_4$ (or any of these values may serve as a maximum methane content) and/or at least 50, 60, 70, 75, 80, 85, 90, 95, 97.5, or 99 vol. % $H_2$ (or any of these values may serve as a maximum hydrogen gas content). The gases may be diluted by an inert gas, such as $N_2$, Ar, and/or He, and in some circumstances, $CO_2$ may be used as an pseudo-inert gas. The gas stream may comprise 2 to 10, 2.5 to 7.5, 3.33 to 6.67, or 4 to 6 vol. % $CH_4$ and/or 90 to 98, 92 to 97, 93.3 to 96.7, or 94 to 96 vol. % $H_2$. The contacting may be for a time period of at least 2, 2.5, 3, 4, 5, 6, 7, 8, 9, 10, or 12.5 second and/or up to 30, 25, 20, 17.5, 15, 12.5 or 10 seconds.

The graphene may be monolayer graphene and/or may have a Raman 2D and G peak intensity ratio, I2D/IG, of at least 2, 2.5, 3, 4, 5, 7.5, or 10. A Raman 2D and G peak intensity ratio, I2D/IG, of the graphene may be 1±0.25, 0.1, 0.01, or 0.001.

Aspects of the invention include devices. Preferable reaction vessels may include walls comprising steel and/or glass, and potentially coated by fluoropolymer coatings. Inventive covers should be removably attached to the reaction vessel, but may likewise be made of steel and/or glass, and may particularly contain one or more windows, particularly in larger forms. Walls of the reactor should generally be in a thickness of 5, 10, 25, 50, or 100 mm, depending upon the pressure application contemplated. While lab-scale reactors may be 80 cc, larger reactors (e.g., 1, 4, 10, 25, 100, 250, 1000 L, or more) are contemplated. The cover should be configured to seal a reactor space of the reaction vessel and allow access to the reaction vessel upon removal, and should be suitable to withstand, for example, 10, 50, 100, 250, 500, 750, 1000, 5000, or even 10000 bar, depending upon the application. Likewise, the reactor and/or cover may be suitable to withstand, e.g., vacuums of 100, 10, 1, 0.1, 0.01, 0.001, 0.0001, or even 0.00001 mbar. The cover(s) may include 1, 2, 3, 4, 5, or more holes suitable for feeding into the reaction vessel without the removal of the cover. A heating apparatus at least partially encompassing and in direct contact with the reaction vessel is generally provided, and the coverage of the reactor surface may be at least 50, 60, 70, 75, 80, 85, 90, 95, 99, or 100% of the outer surface of the reactor. One, two, three, or more pipes (corresponding to the number of holes in the cover) are generally provided, such pipes (or hoses or tubes) being configured to extend from outside an outer perimeter of the heating apparatus through the hole in the cover, into the reaction vessel. The wall thickness and material of the pipes will generally depend upon the pressure contemplated for the reaction, though relevant materials may be fused silica, copper, steel, or the like, with a wall thickness of 1, 2, 5, 10, or 25 mm. Any pipe may including 1, 2, 3, 4, 5, or more valves configured to regulate gas flow into and/or out of the reaction vessel. A sheath may be provided around one or more of the pipes, and the sheath should be configured to directly contact and surround an outer surface of the pipe across an interface between the cover and the reaction vessel. The sheath should generally comprise a heat resistant material, particularly an elastomer, such as a silicone rubber and/or fluoroelastomer.

Inventive methods may involve diverting waste fly ash from landfilling, e.g., using 10, 25, 50, 75, or 90 wt. % of the fly ash produced by a plant for graphene production, rather than landfilling. The products of the processes described herein may be packed into filters or filter forms, then used in the purification of water and/or air, for example. Carbonaceous products describe herein may be used, for example, in decolorizing chemical solutions. The graphene in inventive products may be used without separation from the minerals/metal oxide(s) or may be separated by physical means, e.g., vibration and shifting, suspending in fluid, centrifugation, and/or filtration.

Inventive methods and/or materials may exclude, contain only traces of, or contain no more than 5, 4, 3, 2.5, 2, 1, 0.5, 0.1, 0.01, 0.001, 0.0001, or 0.00001 wt. %, relative to total reaction component weight, of metal hydroxide(s) and/or salt(s), such as those of Li, Na, K, Cs, Be, Mg, Ca, Sr, Ba, B, Al, Ga, In, Cs, Rb, and/or Ti. Final graphene products according to the invention, may contain amounts or traces of original fly ash minerals, such as $SiO_2$, $Al_2O_3$, $Fe_2O_3$, and/or CaO, but generally no more than in the original source fly ash and ordinarily less. For example, the final graphene products may contain no more than 15, 10, 7.5, 5, 2.5, 2, 1, 0.1, 0.01, 0.001, or 0.0001 wt. % of $SiO_2$, $Al_2O_3$, $Fe_2O_3$, and/or CaO, individually or as a selected or complete group, based upon the total (graphene) product weight.

Inventive methods and/or materials may exclude, contain only traces of, or contain no more than 5, 4, 3, 2.5, 2, 1, 0.5, 0.1, 0.01, 0.001, 0.0001, or 0.00001 wt. %, relative to total reaction component weight, of surfactant(s), such as sodium dodecyl sulfate (SDS), sodium dodecyl benzene sulfonate, pyridinium (PY+), thionin acetate salt, and/or triton.

Inventive methods do not require the presence of an acid, particularly not a strong acid, and may exclude or use no more than 40, 33, 25, 20, 15, 10, 7.5, 5, 4, 3, 2, 1, or 0.5 wt. %, relative to the total reagent weight, of acid(s), esp. strong acids, such as HCl, HBr, HI, $H_2SO_4$, triflic acid, and/or toluene sulfonic acid.

Inventive methods and/or materials may exclude, contain only traces of, or contain no more than 25, 20, 15, 10, 7.5, 5, 4, 3, 2.5, 2, 1, 0.5, 0.1, 0.01, 0.001, 0.0001, or 0.00001 wt. %, relative to total reaction component weight, of graphite, particularly fluorinated graphite or other source of elemental carbon.

Inventive methods and/or materials may exclude, contain only traces of, or contain no more than 5, 4, 3, 2.5, 2, 1, 0.5, 0.1, 0.01, 0.001, 0.0001, or 0.00001 wt. %, relative to total reaction component weight, of sand, particularly quartz sand, cyclohexane compounds, such as methyl allyl cyclohexene, citrate compounds, such as butyryltrihexylcitrate, trimellitic acid compounds, such as trioctyl trimellitate and/or nonyl hexyl trimellitate, and/or glycol and/or benzoate compounds, such as diethylene glycol benzoate.

Aspects of the invention provide methods for preparing graphene using fly ash, for example, by growing graphene on the surface of fly ash. Aspects of the invention comprise fast, facile, and/or cost-effective methods of preparing high quality graphene. Aspects of the invention include a thermal reactor system suitable for the synthesis of graphene using fly ash or otherwise. Inventive aspects may comprise growing graphene on the surface of fly ash in the presence of an N-heterocyclic aromatic compound, optionally charged, such as 1-(4-pyridyl)pyridinium chloride hydrochloride, and/or a oxidizing agent, preferably containing pyridinium chlorochromate or an analog thereof, preferably in polymeric form, such as poly(4-vinylpyridinium chlorochromate). Aspects of the invention provide mono and/or bilayer graphene free of defects, e.g., with at least 75, 80, 85, 90, 91, 92, 92.5, 93, 94, 95, 96, 97, 97.5, 98, 99, 99.1, 99.5, 99.9, 99.99, or 99.999% or more of the planar honeycomb units or area having flawless structure, relative to total units or area.

Inventive preparations of graphene may involve the polymerization of 1-(4-pyridyl)-pyridinium chloride hydrochloride on the surface of fly ash. Such polymerizations may occur under bubbling of dilute methane in a gas, such as hydrogen gas. The growth may be performed in a cylinder tube made of stainless-steel coated from inside with Teflon. Such cylinders may have a volume capacity of at least 20, 40, 60, 80, 100, 250, 500, 1000, 5000, $1\times10^4$, $5\times10^5$, $1\times10^5$, $1\times10^6$, or $1\times10^7$ cm$^3$ and/or up to 10,000, 5,000, 2,500, 1,000, 750, 500, 250, 200, 150, 125, 100, 75, 60, 50, 40, 25, 15, 10, 5, 4, 2, 1, or 0.5 L. The (cylindrical) reactor may be sealed prior to heating, and subsequently heated or inserted in the electric oven. The reactor may be evacuated and filled (or flushed out) with an inert gas, such as $N_2$, Ar, and/or He, but preferably containing $CH_4$ and $H_2$, as discussed above, before sealing and/or heating.

The cylinder may have a stainless-steel cover which fixed from the top by a hinge, screws, nails, bolts, clamps, or the like. The top of the cylinder may be flanged. The cover of the cylinder or reactor may include an orifice which may be surrounded by an insulator and/or heat resistant tube, such as a heat resistant rubber tube. At least one heat-resistant tube, e.g., a silicone or silica tube, may be inserted into (projecting inside or to the outer wall) of the cylinder through such an orifice, for example, in such a configuration as to bubble the gas in a solution in the cylinder (or reactor). This heat-resistant tube may be connected with a gas tank or gas generator through a valve, regulator, or similar device to control the amount, time, and/or duration of gas flow. The cylinder may be located in an heater, such as a gas, coal-fired, or electric oven as shown in FIG. 1, though the heat may be supplied in any conventional manner, such as by a heating mantle or (fluid) heat exchanger in a plant with available thermal resources, e.g., chemical plant, refinery, solar thermal facility, or the like.

Inventive processes of graphene growth using fly ash may be performed by dispersing the fly ash in a solvent, such as water, an alcohol, ether, ester, amide, aromatic hydrocarbon, alkane, or mixture of these, e.g., toluene, xylene(s), o-dichlorobenzene, pyridine, N,N-dimethylformamide (DMF), N,N-dimethylacetamide, N-methyl pyrrolidone (NMP), hexamethylphosphoramide (HMPA), dimethyl sulfoxide (DMSO), acetonitrile, tetrahydrofuran (THF), 1,4-dioxane, dichloromethane, chloroform, carbon tetrachloride, dichloroethane, acetone, ethyl acetate, methyl acetate, butyl acetate, pet ether, pentane, hexane(s), cyclohexane, heptane (s) decane, decalin, THF, dioxane, toluene, xylene(s), o-dichlorobenzene, diethyl ether, methyl t-butyl ether, methanol, ethanol, isopropanol, propanol, n-butanol, and/or ethylene glycol.

A heteroaromatic compound, preferably charged, such as 1-(4-pyridyl)pyridinium chloride hydrochloride, may be added to the dispersed fly ash in the solvent, e.g., ethanol. The ratio for fly ash to heteroaromatic, e.g., 1-(4-pyridyl) pyridinium chloride hydrochloride, may be 1:2 by weight, e.g., 1:0.75, 1:1, 1:1.25, 1:1.5, 1:1.75, 1:2, 1:2.25, 1:2.5, 1:2.75, 1:3, 1:3.5, 1:4, 1:4.5, 1:5, or some range including any of these endpoints. Exemplary heteroaromatic compounds may include, for example, an HCl, HBr, $H_2SO_4$, acetate, citrate, tartrate, tosylate, mesylate, besylate, triflate, and/or trifluoroacetate salt of a pyrylium compound or a permanently charged N-heteroaromatic compound including a pyridinium, imidazolium, imidazolinium, quinolinium, isoquinolinium, pyrazolium, oxazolium, phenanthrolinium, thiazolium, benzothiazolium, imidazolium, triazolium, 1,2, 5-oxadiazolium, 1,2,3-oxadiazolium, thiadiazolium, pyridazinium, pyrazinium, triazinium, oxazinium, tetrazolium, pyrimidinium, indolizinium, indazolium, azaindolium, napththyridinium, pyrido[3,2-d]pyrimidinium, pyrido[4,3-d]pyrimidinium, pyrido[3,4-b]pyrazinium, pyrido[2,3-b]pyrazinium, pteridinium, and/or purinium unit, such as a compound of Formula I:

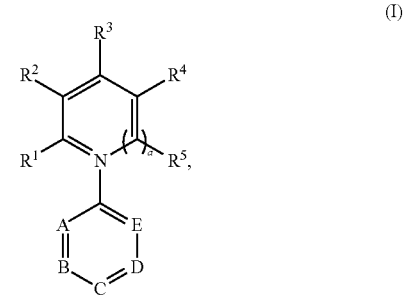

wherein a is 0 or 1, $R^1$ to $R^5$ are independently H, phenyl, benzyl, alkyl (such as methyl, ethyl, propyl, isopropyl, butyl, s-butyl, etc.), perfluoroalkyl (such as —$CF_3$, —$CF_2CF_3$, etc.), monofluoroalkyl, such as fluoroethyl, alkoxy (such as —$OCH_3$, —$OCH_2CH_3$, —$OCH(CH_3)_2$, etc.), fluoro, chloro, amide (such as —NH—COCH$_3$, —NH—COCH$_2$CH$_3$, —NCH$_3$—COCH$_3$, etc.), carboxylate, sulfonate, ester (such as —O—COCH$_3$, —O—COCH$_2$CH$_3$, etc.), or amine (such as —NH$_2$, —N(CH$_3$)$_2$, —N(CH$_3$)$_2$, —NEt$_2$, etc.), whereby 1 or 2 adjacent pairs of R$^1$ to R$^5$ may form a fused 5, 6, or 10-member ring, which may likewise be heterocyclic (i.e., contain S, O, N, and/or P), A to E is independently CR$^6$ or N, wherein R$^6$ may independently be any of the groups indicated for R$^1$ to R$^5$. Examples of suitable compounds may include chlorides, bromides, iodides, acetates, aminoacetates, aminopropionates, sulfates, alkyl sulfonates, perfluoroalkyl sulfonates, tosylates, alkyl sulfates, hydrogen sulfates, dialkyl phosphates, nitrates, hydrogen sulfates, hexafluoroantimonates, tetrafluoroborates, tetrachloroaluminates, bis(pentafluoroethylsulfonyl)imides, bis(trifluoromethylsulfonyl)imides, dicyanamides, hexafluorophosphates, and/or thiocyanates of 1-allyl-3-methylimidazolium, 1-benzyl-3-methylimidazolium, 1,3-bis(cyanomethyl)-imidazolium, 1-butyl-2,3-dimethylimidazolium, 4-(3-butyl-1-imidazolio)-1-butanesulfonate, 1-butyl-3-methylimidazolium, 1-(3-cyanopropyl)-3-methylimidazolium, 1-decyl-3-methylimidazolium, 1,3-diethoxyimidazolium, 1,3-dihydroxy-2-methylimidazolium, 1,3-dimethoxyimidazolium, 1,3-dimethoxy-2-methylimidazolium, 1,2-dimethyl-3-propylimidazolium, 1-dodecyl-3-methylimidazolium, 1-ethyl-2,3-dimethylimidazolium, 1-ethyl-3-methylimidazolium, 1-hexyl-3-methylimidazolium, 1-(2-hydroxyethyl)-3-methylimidazolium, 1-methylimidazolium, 1-methyl-3-octylimidazolium, 1-methyl-3-propylimidazolium, 1-propyl-2,3-dimethyl-imidazolium, 1-propyl-3-methylimidazolium, 3-(4-(3-(4-(dimethylamino)phenyl)-1-oxo-2-propenyl)phenyl)-5-hydroxy-1,2,3-oxadiazolium, 1-methyl-1,10-phenanthrolinium, 6-methyl-3,4-dihydroquinolizinium, 6-(4-pyridyl)-3,4-dihydroquinolizinium, 1-(4-pyridyl)pyridinium, 1-(2-pyridyl)pyridinium, 4-(2'-pyridyl)-1-methylpyridinium, and/or 1-methyl-2-(2-pyridyl)pyridinium.

A oxidizing agent, such as hypochlorite, ozone, peroxysulfuric acid, m-chloroperbenzoic acid, perborates, permanganates, pyridinium chlorochromate (PCC), quinolinium chlorochromate, and/or poly(4-vinylpyridinium chlorochromate) may be added to the solution/mixture of fly ash and 1-(4-pyridyl)pyridinium chloride hydrochloride. The weight ratio of the oxidizing agent, e.g., poly(4-vinylpyridinium chlorochromate), relative to the fly ash may be 1:1.5 by weight, e.g., 1:1.25, 1:1.3, 1:1.33, 1:1.35, 1:1.4, 1:1.45, 1:1.5, 1:1.55, 1:1.6, 1:1.65, 1:1.67, 1:1.7, 1:1.75, or a range including any of these endpoints.

Relevant reaction temperatures of the oven could be 50, 60, 85, 100, 110, 120, 125, 130, 140, 150, 155, 160, 165, 170, 175, 180, 185, 190, 200° C., or some range including any of these endpoints. For example, a desirable reaction temperature could be 150±1, 2, 3, 4, 5, 7.5, 10, or 12.5° C., 160±1, 2, 3, 4, 5, 7.5, 10, or 12.5° C., or 170±1, 2, 3, 4, 5, 7.5, 10, or 12.5° C.

A diluted methane/hydrogen gas can be allowed to flow and/or bubble into the solution. The rate of diluted methane/hydrogen gas flow may be, for example, 5:25, 5:30, 5:33, 5:40, 5:50, 5:55, 5:60, 5:65, 5:70, 5:75, 5:80, 5:85, 5:90, 5:95, 5:100, 5:125, 5:150, 5:175, 5:200, 5:250, 5:300, 5:350, 5:400, or 5:500 sccm (standard cm$^3$/minute), or in any range of these endpoints. In some applications, a preferred flow rate of diluted methane/hydrogen gas may be 5:95 sccm. Useful bubbling durations for diluted methane in hydrogen gas bubbling may be 12 seconds. Inventive methods may grow graphene via the polymerization of 1-(4-pyridyl)pyridinium chloride hydrochloride along the surface of fly ash. The following examples are given for purpose of illustrative discussion of useful conditions within the scope of the invention, but should not be construed as limiting.

Disregarding water, normal air has, by volume, 78.084% N$_2$, 20.946% O$_2$, 0.9340% Ar, 0.04338% other gases (0.0407% CO$_2$, 0.001818% Ne, 0.000524% He, 0.00018 CH$_4$, 0.000114% Kr, 0.000055% H$_2$). Inventive methods may employ concentrations of H$_2$ and/or CH$_4$ above that in air or ambient environments, such as at least 0.1, 0.025, 0.5, 1.0, 1.5, 2.0, 2.5, 3, 4, or 5 vol. % and/or up to 15, 12.5, 10, 9, 8, 7, 6, or 5 vol. % methane, preferably in H2, but possibly in a hydrogen-enriched gas, e.g., having at least 50, 60, 70, 75, 80, 85, 90, 95, 97, 97.5, 98, 99, 99.1, 99.5, or 99.9 vol. % H$_2$.

Example 1

Preparation of Graphene

About 100 mg of fly ash and 200 mg of 1-(4-pyridyl)pyridinium chloride HCl were added to a glass beaker containing 50 mL of ethanol to give a mixture. The mixture was sonicated for 30 minutes at 60° C., then 150 mg of poly(4-vinylpyridinium chlorochromate) were added and the whole mixture was stirred for 40 minutes at room temperature (T ~22° C.). After stirring for 40 minutes, the whole mixture was transferred to the exemplary reactor system depicted in FIG. 1. The system sealed and the temperature was raised to 160° C. for 60 minutes. During the heated reaction, dilute methane in hydrogen gas was bubbled through the mixture with flow rate of 5:95 sccm (standard cm$^3$/minute) for 10 seconds as the only gasses present during the reaction. After 60 minutes at 160° C., the reaction was stopped by quenching the reactor cylinder in an ice bath at 4° C. for 10 minutes, resulting in a suspension. The suspension was collected via centrifugation at 15000 rpm for 15 minutes. The supernatant was collected and washed by de-ionized water to remove (excess) salts and centrifuged again at 6000 rpm for 10 min. The product was dried at 60° C. for 12 hours.

Example 2

The influence of CH$_4$:H$_2$ gas ratio on the growth of graphene: The experiment in Example 1 was repeated under the same conditions except that the ratio of flow rates of CH$_4$:H$_2$ was varied at 5:25, 5:55, 5:75 or 5:95 sccm (standard cm$^3$/minute), and the reaction carried out at 50° C. The Raman spectra for the graphene produced as described above at the varied flow rate ratios were measured and depicted in FIG. 4.

Example 3

Figure 5:
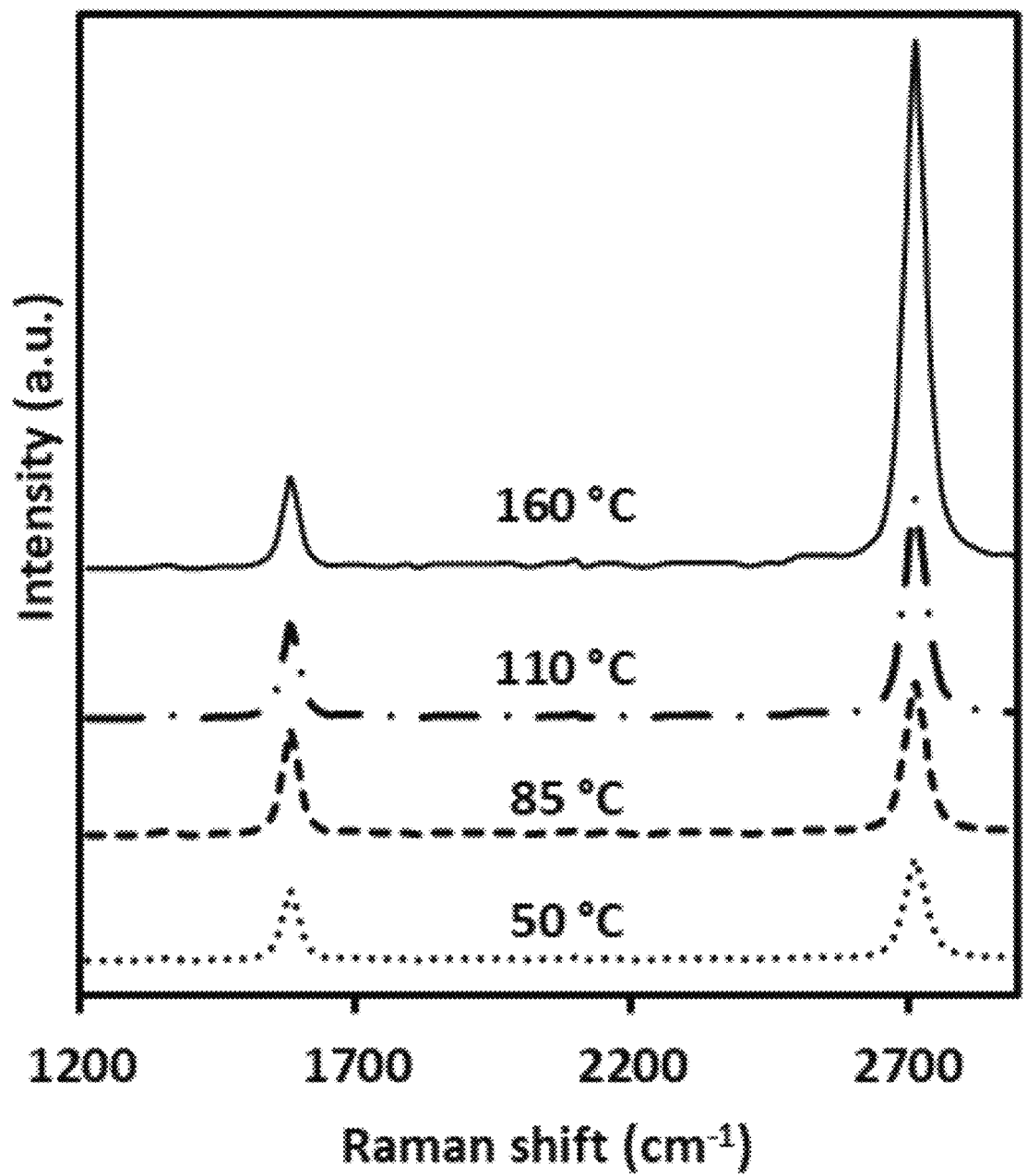
FIG. 5 shows Raman spectra for exemplary graphene produced according to the invention at various temperatures.

The influence of temperature on the growth of graphene: The experiment in Example 1 was repeated under the same conditions except that the reaction was carried out at varied temperatures, i.e., 60, 85, 100, and 160° C. The Raman spectra for the graphenes produced in Example 3 at these varied temperatures were measured and are shown in FIG. 5.

Aspects of the invention provide methods for preparing graphene using fly ash in a thermal reactor. The thermal reactor may include a cylindrical tube with capacity of 80±5, 10, 15, or 25 cm$^3$, which tube may be coated on an inside wall with a fluoropolymer film, such as PTFE, and the reactor may include a cover including one or more orifices to allow one or more silica or silicon tubes to pass through the orifice such that a gas may flow into the reaction chamber and/or through the solvent containing the reactants. The thermal reactor located in an electric oven, a gas-fired oven a coal-fired oven, a heating mantle, a heat exchange fluid-heated vessel, or a direct heater from thermal waste (e.g., in a cracker, refinery, chemical plant, or the like).

Graphene may be inventively prepared by: (a) dispersing fly ash and 1-(4-pyridyl)-pyridinium chloride hydrochloride in ethanol to obtain a solution mixture with a weight ratio of 1:2 for 30 minutes at 60° C.; then (b) adding 1.5 weight part (according to the weight ratio) of poly(4-vinylpyridinium chlorochromate) to the mixture and stirring for 40 minutes at ambient temperature (a temperature in a range of at least 15, 16, 17, 18, 19, 20, 21, 22, 23, or 24° C. and/or up to 45, 42.5, 40, 37.5, 35, 32.5, 30, 27.5, 25, 24, 23, or 22.5° C.); optionally (c) transferring the mixture to a reactor system, e.g., as shown in FIG. 1, if not already in an appropriate reactor, and optionally sealing the reactor system and raising the temperature to 160° C. for 60 minutes; (d) flowing dilute $CH_4$ in $H_2$ gas through the solution/fluid in the reactor system at a rate of 5:95 sccm for 10 seconds. The graphene may be monolayer at $CH_4$:$H_2$ flow rate of 5:95 sccm and temperature of 160° C.

Graphenes produced according to the invention may have fewer than 15, 10, 7.5, 5, 4, 3, 2, 1, or 0.5%, based on the relevant structural unit (generally hexagon unit) of one or all of the defects selected from, e.g., Stone-Wales defects, single vacancy defects, multiple vacancy defects, line defects, out-of-plane carbon adatoms, foreign adatoms, and/or substitutional impurities. Such defects are described, at least in part, in *Micromachines* 2017, 8, 163, 1-15, which is incorporated by reference in its entirety herein.

Referring now to the drawings, wherein like reference numerals designate identical or corresponding parts throughout the several views.

FIG. 1 shows an exemplary reaction system suitable for forming graphene by methods described herein. The set-up shown includes a reactor vessel 1, e.g., cylindrical reactor, which may be made of (stainless) steel or glass or any other suitably inert material. The reactor vessel 1 may have one or more, or all, coated walls 2, e.g., having a fluoropolymer, such as PTFE, PVDF, PHFP, or the like. The reactor vessel 1 may have one, two, three, or more removable covers 3 (one shown), which may be attached to the reactor vessel 1 with fixing elements 4, e.g., screws, bolts, claims, or the like, whereby a screw-on or twist-lock type of cover 3 may be used and the mouth interfacing with the cover 3 may have a flange to facilitate clamping, bolting, or the like. The cover 3 may be penetrated by a hole allowing a pipe or tube 6, made of glass, stainless steel, fused silica, silicone, or some other suitable material, suitable for feeding gases into the reaction vessel 1. The pipe or tube 6 may be surrounded by a heat resistant and/or insulating jacket or sheath 5, made or a material such as fluoroelastomer(s), silicone elastomer(s), ethylene acrylic elastomer(s), urethane rubber(s), and/or acrylonitrile butadiene rubber(s) (NBR). The tube/pipe 6 may contain one or more valves 7, which may be arranged to be accessible outside of the heating device, to allow gas from a gas inlet 8 to enter and/or leave the reactor vessel 1, or to seal the atmosphere of the reactor/reaction vessel 1. The reaction vessel 1 may be contained partially or fully in a heating device or oven 9, to allow the reaction vessel 1 to reach a desired temperature. The heating device 9 may be an electric device, part of an analog heat transfer system (i.e., receiving excess heat from elsewhere in a plant), combustible driven, fuel cell driven, or some combination of these. Within the reactor/reaction vessel 1, fly ash particles 10 and one or more solvents 11 containing organic compound(s), may be arranged. The reaction vessel 1 may be mechanically stirred by an anchor, propeller, fins, or the like, or by a magnetic stirrer (any conventional stirrer), and the sides of the reaction vessel 1 may contain baffles (not shown) or some vortex-breaking feature.

Figure 2:
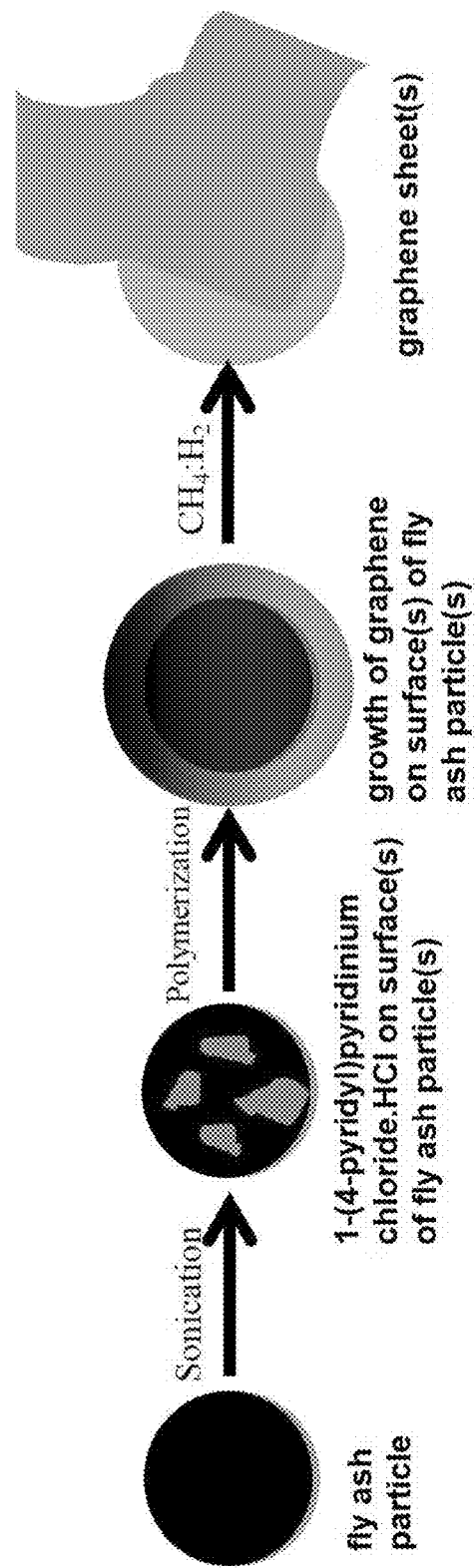
FIG. 2 shows a schematic diagram for a possible mechanism of growth of graphene on the surface of fly ash.

FIG. 2 provides images of a proposed theoretical reaction process for the synthesis of graphene within the scope of the invention.

Figure 3A:
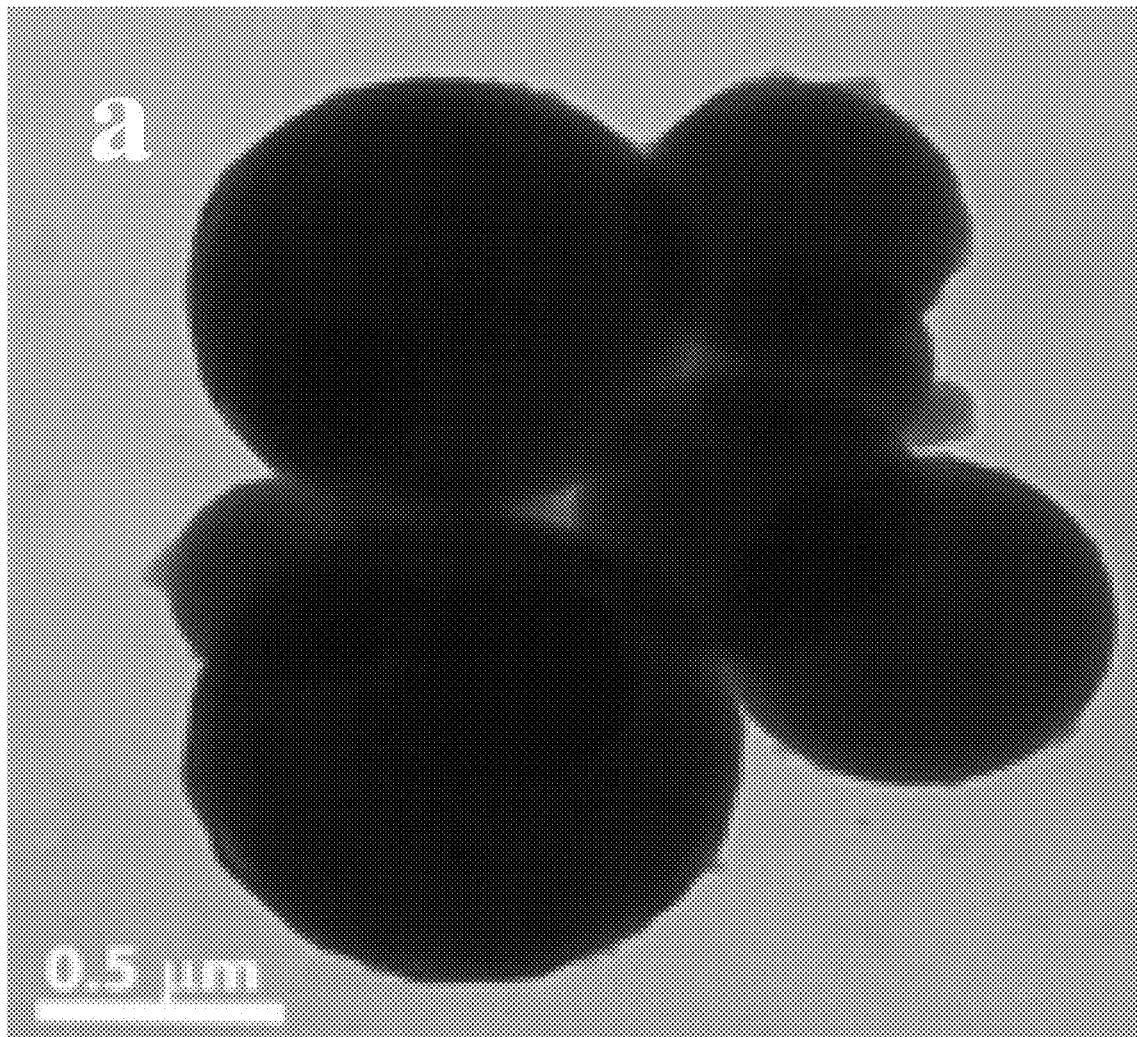
FIG. 3A shows a transmission electron microscope (TEM) image of a suitable fly ash.
Figure 3B:
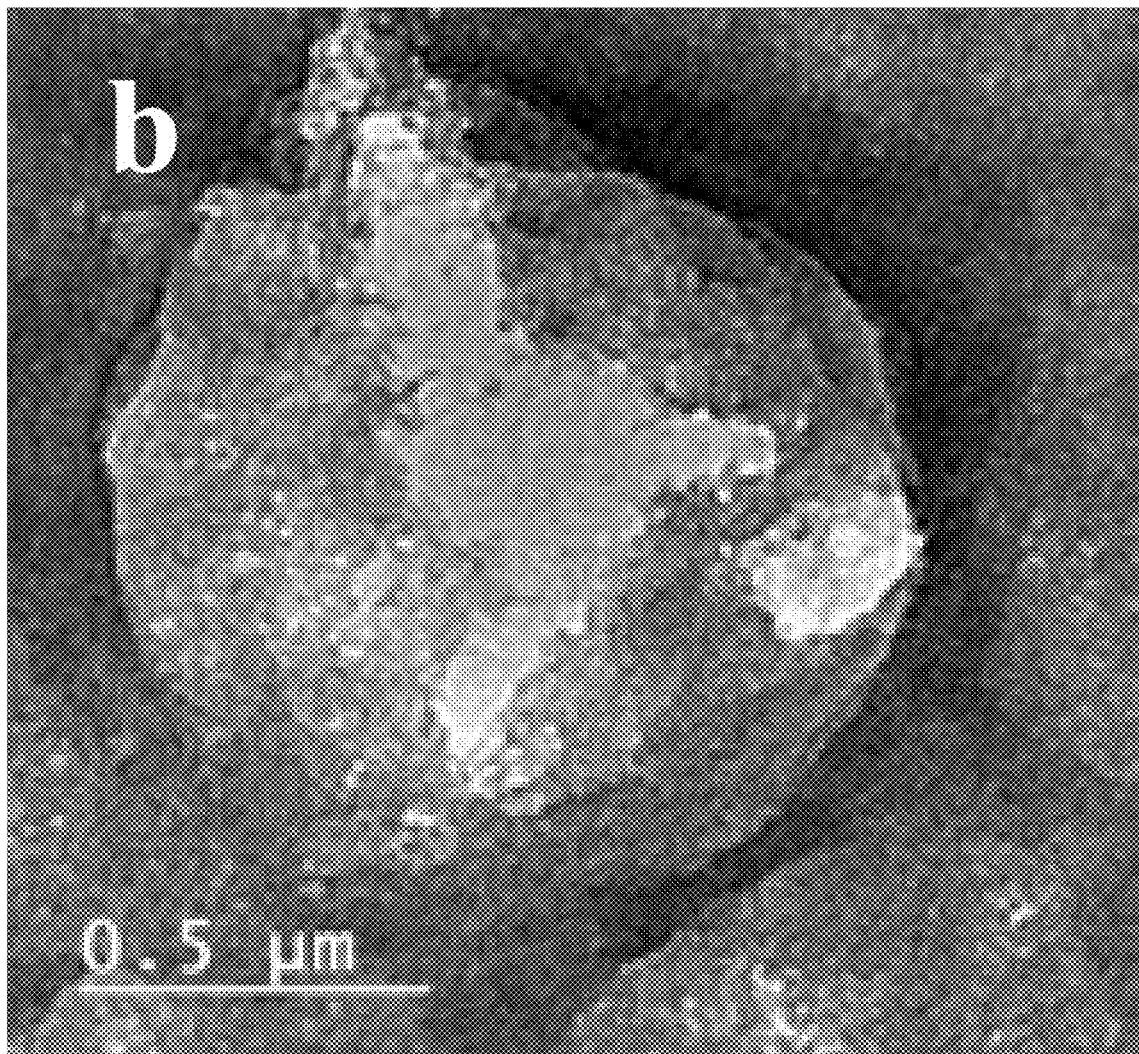
FIG. 3B shows a TEM image of a composition comprising an exemplary fly ash including 1-(4-pyridyl)-pyridinium chloride hydrochloride on its surface.
Figure 3C:
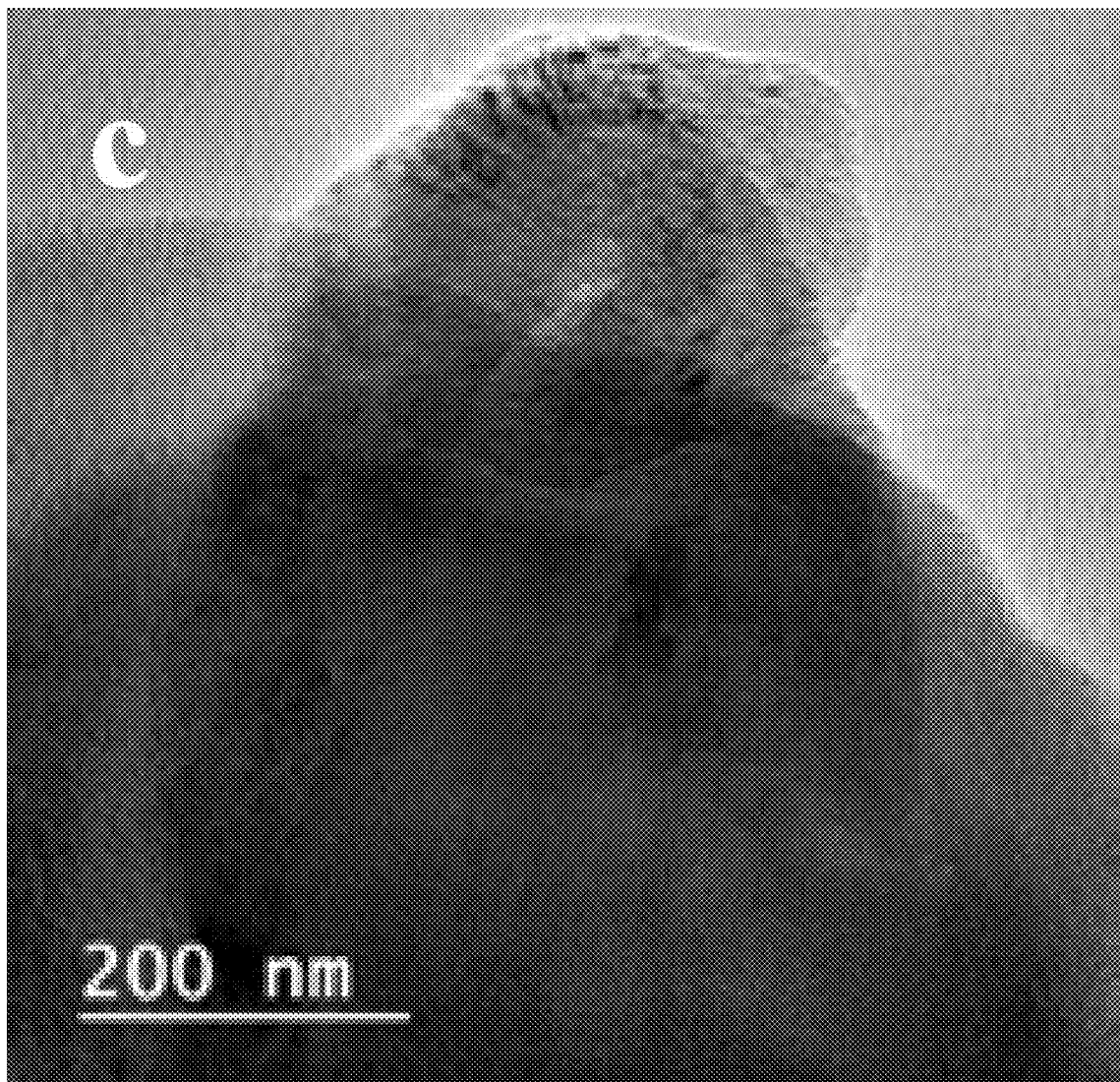
FIG. 3C shows a TEM image of the growth of graphene on the surface of fly ash.
Figure 3D:
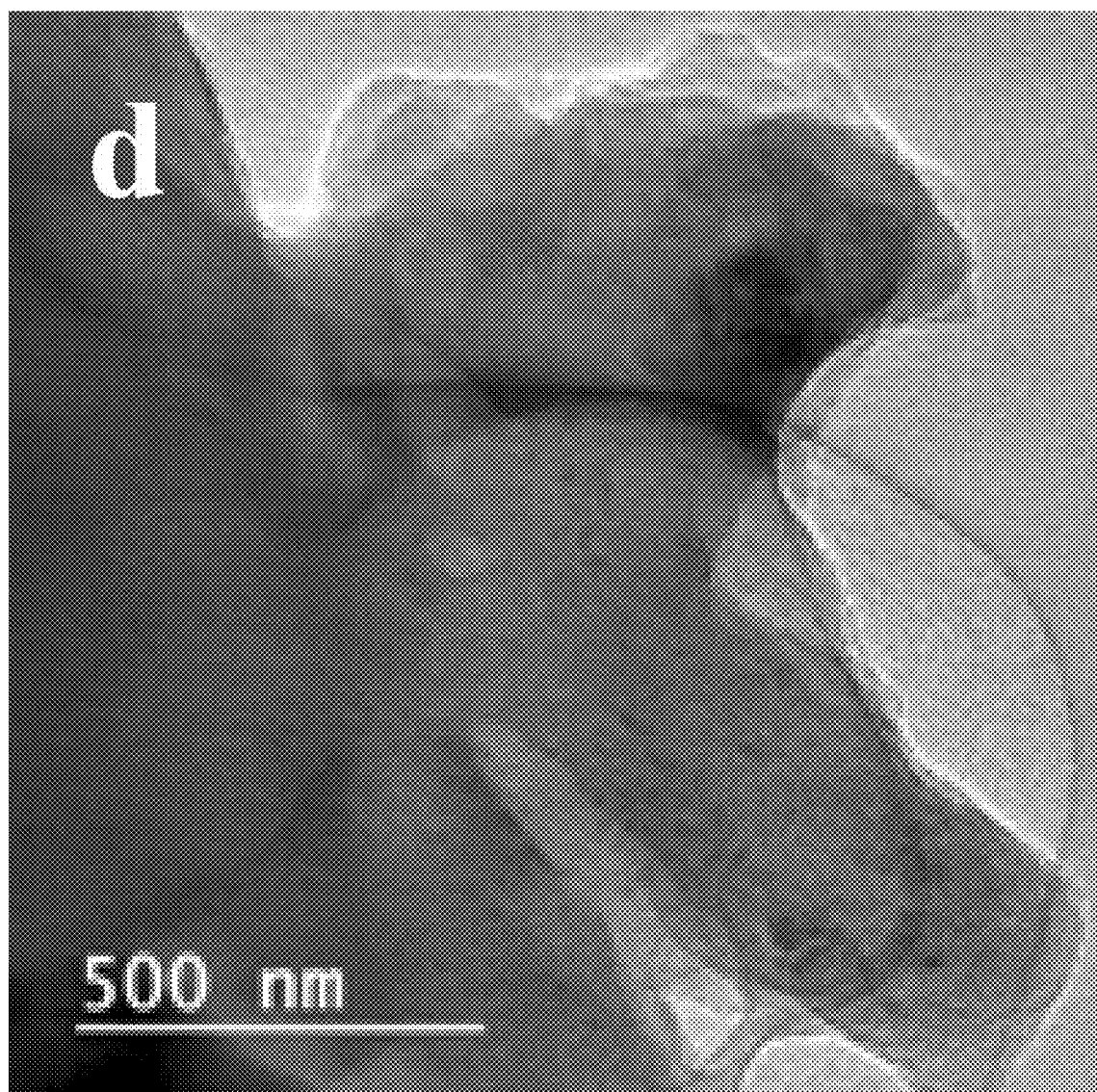
FIG. 3D shows a TEM image of an exemplary graphene produced according to the invention.

FIG. 3A to 3D show the transmission electron microscope (TEM) images of the stages of the inventive reaction exemplified herein, starting from fly ash in FIG. 3A, through fly ash with 1-(4-pyridyl)-pyridinium chloride hydrochloride in FIG. 3B, through growth of graphene on one or more fly ash surfaces in FIG. 3C, to graphene sheets in FIG. 3D. As may be seen in FIG. 3D, graphene sheets produce according to the invention may be at least 0.5, 1, 2.5, 3, 4, 5, 7.5, 10, or 15 μm in its longest dimension, while aspect ratios of the graphenes may be anywhere from 1:1 to 1:10, e.g., 1:1 to 1:5, 1:1 to 1:3.33, 1:1 to 1:2, or 1:1 to 1:1.5.

Figure 4:
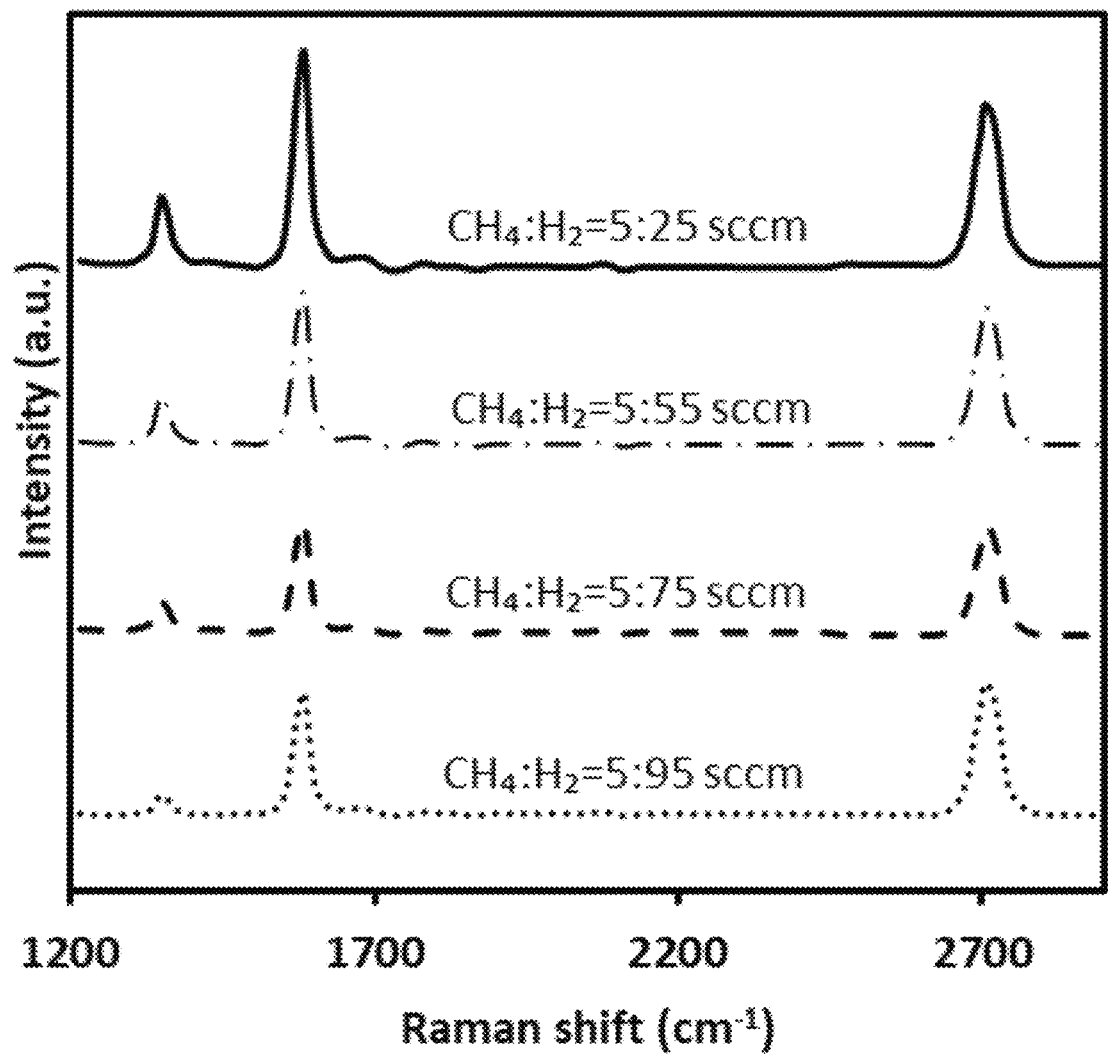
FIG. 4 shows Raman spectra for the produced graphene at various methane/hydrogen gas flow rates.

FIG. 4 shows the Raman spectra for the graphene produced in Example 3 at varied flow rate ratios, i.e., $CH_4$:$H_2$ flow rate ratios of 5:25, 5:55, 5:75 or 5:95 sccm (standard cm$^3$/minute). Typical D, G, and 2D bands are evident at 1323 cm$^{-1}$ (D), 1585 cm$^{-1}$ (G), and 2705 cm$^{-1}$ (2D). The D band intensity can be seen to decrease with increasing the $CH_4$:$H_2$ ratio, illustrating a low intensity at a $CH_4$:$H_2$ flow rate ratio of 5:95 sccm, which implies that the graphene produced as described herein has low defects. Moreover the intensity of the G band decreased and the intensity of 2D bands are seen to increase with increasing the $CH_4$:$H_2$ ratio. The ratio of I(2D)/I(G) is or approaches 1 at a $CH_4$:$H_2$ flow rate ratio of 5:95 sccm, implying that the production of bilayer graphene.

FIG. 5 shows the Raman spectra for the graphenes produced in Example 3 at varied temperatures, i.e., 60, 85, 100, and 160° C. The D bands in FIG. 5 has low intensity or is absent, implying that the produced graphene in Example 3 has very low or no defects. However, the intensity of the G band can be seen to decrease, while the intensity of the 2D bands increases, with increasing temperature from 60 to 160° C. The number of graphene layers may be determined from the ratio I(2D)/I(G), whereby it can be calculated that the I(2D)/I(G) is greater than 2 in the case of T being 160° C., implying the production of monolayer graphene. Contrary to the results for 160° C., the reaction temperatures from 60 to 110° C. yielded spectroscopic data in which the 1 is less that I(2D)/I(G) which is less than 2, implying the production of bilayer graphene.

Numerous modifications and variations of the present invention are possible in light of the above teachings. It is therefore to be understood that within the scope of the appended claims, the invention may be practiced otherwise than as specifically described herein.

REFERENCE SIGNS 1 reactor vessel, e.g., cylindrical reactor
2 coated wall, e.g., PTFE
3 removable cover
4 fixing elements, e.g., screws
5 insulating heat resistant sheath
6 silica tube
7 valve
8 gas inlet
9 heating device/oven
10 fly ash particles
11 solvent containing organic compound

The invention claimed is:

1. A method for forming graphene-coated particles, the method comprising:
    sonicating a mixture of a fly ash, 1-(4-pyridyl)pyridinium chloride HCl and ethanol to form a fly ash ethanol dispersion,
    mixing a polymer-supported oxidizing agent with the fly ash ethanol dispersion to form a dispersed mixture;
    reacting the dispersed mixture, comprising the fly ash, the 1-(4-pyridyl)pyridinium chloride HCl, the ethanol, and the polymer-supported oxidizing agent to form a second mixture comprising polymer-coated fly ash; and
    contacting the second mixture, in liquid form, at a temperature of 120 to 180° C. with a gas stream comprising at least 0.1 vol. % $CH_4$ and/or at least 10 vol. % $H_2$ to form graphene on the fly ash.

2. The method of claim 1, wherein the fly ash and the 1-(4-pyridyl)pyridinium chloride HCl are used in the reacting in a relative weight ratio in a range of from 1:1.5 to 1:3.

3. The method of claim 1, wherein the polymer-supported oxidizing agent is poly(4-vinylpyridinium chlorochromate).

4. The method of claim 1, wherein the gas stream in the contacting comprises at least 1 vol. % $CH_4$.

5. The method of claim 1, wherein the gas stream in the contacting comprises at least 50 vol. % $H_2$.

6. The method of claim 1, wherein the gas stream comprises 2 to 10 vol. % $CH_4$ and 90 to 98 vol. % $H_2$.

* * * * *